US011439995B2

(12) United States Patent
Groeneveld et al.

(10) Patent No.: US 11,439,995 B2
(45) Date of Patent: Sep. 13, 2022

(54) THREE-DIMENSIONALLY STRUCTURED POROUS CATALYST MONOLITH OF STACKED CATALYST FIBERS

(71) Applicant: BASF SE, Ludwigshafen am Rhein (DE)

(72) Inventors: Esther Groeneveld, De Meern (NL); Peter Berben, De Meern (NL); Bernard Reesink, De Meern (NL); Bart Michielsen, De Meern (NL); Jasper Lefevere, De Meern (NL)

(73) Assignee: BASF SE, Ludwigshafen am Rhein (DE)

( * ) Notice: Subject to any disclaimer, the term of this patent is extended or adjusted under 35 U.S.C. 154(b) by 528 days.

(21) Appl. No.: 16/464,998

(22) PCT Filed: Nov. 29, 2017

(86) PCT No.: PCT/EP2017/080795
§ 371 (c)(1),
(2) Date: May 29, 2019

(87) PCT Pub. No.: WO2018/099957
PCT Pub. Date: Jun. 7, 2018

(65) Prior Publication Data
US 2020/0016584 A1    Jan. 16, 2020

(30) Foreign Application Priority Data
Nov. 30, 2016 (EP) ...................... 16201403

(51) Int. Cl.
| | |
|---|---|
| *B01J 37/03* | (2006.01) |
| *B33Y 10/00* | (2015.01) |
| *B33Y 70/00* | (2020.01) |
| *B33Y 80/00* | (2015.01) |
| *B29C 64/165* | (2017.01) |
| *B01J 21/08* | (2006.01) |
| *B01J 23/755* | (2006.01) |
| *B01J 35/00* | (2006.01) |
| *B01J 35/02* | (2006.01) |
| *B01J 35/04* | (2006.01) |
| *B01J 35/06* | (2006.01) |
| *B01J 37/00* | (2006.01) |
| *B01J 37/02* | (2006.01) |
| *B01J 37/18* | (2006.01) |
| *B29C 64/106* | (2017.01) |
| *B01J 35/10* | (2006.01) |

(52) U.S. Cl.
CPC ............ *B01J 37/038* (2013.01); *B01J 21/08* (2013.01); *B01J 23/755* (2013.01); *B01J 35/006* (2013.01); *B01J 35/023* (2013.01); *B01J 35/04* (2013.01); *B01J 35/06* (2013.01); *B01J 35/10* (2013.01); *B01J 37/0018* (2013.01); *B01J 37/0236* (2013.01); *B01J 37/03* (2013.01); *B01J 37/18* (2013.01); *B29C 64/106* (2017.08); *B29C 64/165* (2017.08); *B33Y 10/00* (2014.12); *B33Y 70/00* (2014.12); *B33Y 80/00* (2014.12)

(58) Field of Classification Search
CPC ......... B33Y 10/00; B33Y 70/00; B33Y 80/00; B29C 64/106; B29C 64/165; B01J 21/08; B01J 23/755; B01J 35/006; B01J 35/023; B01J 35/04; B01J 35/06; B01J 35/10; B01J 37/0018; B01J 37/0236; B01J 37/03; B01J 37/18; B01J 37/038
USPC ................................................. 502/259, 337
See application file for complete search history.

(56) References Cited

U.S. PATENT DOCUMENTS

| | | | |
|---|---|---|---|
| 6,027,326 A | 2/2000 | Cesarano, III et al. | |
| 6,401,795 B1 | 6/2002 | Cesarano, III et al. | |
| 6,993,406 B1 | 1/2006 | Cesarano, III et al. | |
| 7,465,690 B2 * | 12/2008 | Yan ...................... | B01D 53/944 422/177 |
| 7,527,671 B1 | 5/2009 | Stuecker et al. | |
| 8,119,554 B2 | 2/2012 | Kashani-Shirazi et al. | |
| 9,045,410 B2 | 6/2015 | Bouwman et al. | |
| 2015/0035209 A1 | 2/2015 | Shah et al. | |

OTHER PUBLICATIONS

Danaci, S., et al., "Efficient CO2 methanation over Ni/Al2O3 coated structured catalysts", Catalysis Today, vol. 273, (2016), pp. 234-243.
International Preliminary Examination Report for PCT/EP2017/080794 dated Mar. 22, 2019 with Applicant response/amendments to the claims.
International Preliminary Examination Report for PCT/EP2017/080795 dated Mar. 22, 2019 with Applicant response/amendments to the claims.
International Search Report for PCT/EP2017/080794 dated Feb. 16, 2018.
International Search Report for PCT/EP2017/080795 dated Feb. 26, 2018.

(Continued)

*Primary Examiner* — Colin W. Slifka
(74) *Attorney, Agent, or Firm* — Faegre Drinker Biddle & Reath LLP

(57) ABSTRACT

A three-dimensionally structured porous catalyst monolith of stacked catalyst fibers with a fiber diameter of less than 1 mm made from one or more continuous fibers or stacked individual fibers, wherein the stacked catalyst fibers are arranged in a regular, recurring stacking pattern of fiber layers to form the three-dimensionally structured monolith, and wherein in each of the stacked fiber layers at least 50 wt % of the fibers are arranged parallel to each other and spatially separated from each other, or in a cobweb pattern, and wherein the side crushing strength of the monolith is at least 60 N.

20 Claims, No Drawings

(56) References Cited

OTHER PUBLICATIONS

Tubío, C., et al., "3D printing of a heterogeneous copper-based catalyst", Journal of Catalysis, vol. 334, (2016), pp. 110-115.
Written Opinion of the International Searching Authority for PCT/EP2017/080794 dated Feb. 16, 2018.
Written Opinion of the International Searching Authority for PCT/EP2017/080795 dated Feb. 26, 2018.

\* cited by examiner

THREE-DIMENSIONALLY STRUCTURED POROUS CATALYST MONOLITH OF STACKED CATALYST FIBERS

CROSS-REFERENCE TO RELATED APPLICATIONS

This application is a national stage application (under 35 U.S.C. § 371) of PCT/EP2017/080795, filed Nov. 29, 2017, which claims benefit of European Application No. 16201403.9, filed Nov. 30, 2016.

The invention relates to a three-dimensionally structured porous catalyst monolith of stacked catalyst fibers, methods for its preparation and its use in different chemical reactions.

Typically, inorganic catalysts are produced as extruded strands or extruded monolith or honey-comb structures.

Alternative processes which allow for a greater variety of shapes in comparison to a linear stretched honeycomb structure can be prepared e.g. by rapid prototyping processes. The process described in U.S. Pat. No. 8,119,554, for example, involves the production of a shaped body by means of a powder-based rapid prototyping process, in which a binder material is selectively introduced in an inorganic catalyst powder to form the three-dimensional structure.

A further production process often named robocasting can be employed. In this method, a paste of the catalyst material particles is extruded into strands which are deposited in stacked layers to form the desired three-dimensional structure. Subsequently, the structure is dried and sintered. The production of regenerable diesel soot particulate filters by robocasting methods is disclosed in U.S. Pat. No. 7,527,671.

This method has also been employed for preparing $Cu/Al_2O_3$ catalytic systems with a wood pile porous structure. Journal of Catalysis 334 (2016), 110 to 115, relates to the 3D printing of a heterogeneous copper-based catalyst. $Al_2O_3$ powder with a mean particle size of 0.5 μm was added to an aqueous solution of copper(II) nitrate, and the viscosity of the resulting suspension was adjusted by adding hydroxypropyl methyl cellulose as viscosity modifier. The resulting ink was concentrated by the removal of water by evaporation until suitable for extrusion. The aqueous ink was loaded into a syringe attached by a nozzle with a diameter of 410 μm. A robotic deposition system was used to create the woodpile structures. The structure was dried at room temperature for 24 h and subsequently sintered at 1400° C. for 2 h in air.

$Ni/Al_2O_3$-coated structured catalysts are disclosed in Catalysis Today, 273 (2016), pages 234 to 243. To prepare the catalyst, stainless steel supports were prepared using the robocasting process. The resulting 3D structures were sintered at 1300° C. for 4 h and a coating slurry of boehmite powder with nickel loading was applied. Thus, only the stainless steel support structure was prepared by robocasting.

All the above-mentioned processes need a sintering step at temperatures well above 1000° C.

For a number of catalysts employing catalytically active metals, such sintering at high temperatures is detrimental to the catalyst properties. Typically, the dispersion of the catalytically active metal on a catalyst support deteriorates upon this temperature treatment.

To obtain high external surface areas for the catalysts, e.g. for diffusion limited reactions, or high packing fractions with low void volume, in fixed-bed catalyst reactors, the use of smaller catalyst extrudates is necessary. In mass transfer limited reactions the performance of small catalyst extrudates is better than that of larger extrudates, especially in mass-transfer limited reactions. A disadvantage, however, is that smaller extrudates show a higher pressure drop in the packed bed. Furthermore, the mechanical strength of these small extrudates is typically not sufficient to form a packed bed reactor.

The object underlying the present invention is to provide a catalyst containing catalyst fibers or small extrudates which have a mechanical strength that is sufficient to form a packed bed reactor and which preferably has a high surface to volume ratio and shows a low pressure drop in a packed bed reactor.

The catalyst should preferably be in a proper form for possible later washcoating or impregnation.

A further object underlying the present invention is to provide a catalyst including a catalytically active metal which has a high external surface area or high packing fraction and, in case of supported catalysts, a high dispersion of catalytically active metal on the catalyst support. The catalyst structure should be sufficiently mechanically stable so that packed catalyst beds can be formed in a reactor.

A further object is to provide a catalyst shaping process in which prefabricated supported catalysts can be employed.

The object is achieved according to the present invention by a three-dimensionally structured porous catalyst monolith of stacked catalyst fibers with a fiber diameter of less than 1 mm made from one or more continuous fibers or stacked individual fibers, wherein the stacked catalyst fibers are arranged in a regular, recurring stacking pattern of fiber layers to form the three-dimensionally structured monolith, and wherein in each of the stacked fiber layers at least 50 wt % of the fibers are arranged parallel to each other and spatially separated from each other, or in a cobweb pattern, and wherein the side crushing strength of the monolith is at least 60 N.

The object is furthermore achieved according to the present invention by a method for producing the three-dimensional porous catalyst monolith of stacked catalyst fibers, comprising the following steps:

a) preparing a suspension paste in a liquid diluent of metal, metal alloy and/or metal oxide particles of catalytically active metal or metal alloy in which the metals, metal alloy and metal oxide particles can be supported on or mixed with inorganic oxide catalyst support particles, and which suspension can furthermore comprise a binder material, all particles in the suspension having an average particle size in the range of from 0.5 to 500 μm, b) extruding the paste of step a) through one or more nozzles having a maximum diameter or less than 1 mm to form fibers, and depositing the extruded fibers to form a three-dimensional porous catalyst monolith precursor, c) drying the porous catalyst monolith precursor to remove the liquid diluent, d) if necessary, reducing the metal oxide(s) in the porous catalyst monolith precursor to form the catalytically active metal or metal alloy, wherein no temperature treatment of the porous catalyst monolith precursor or porous catalyst monolith at temperatures above 1000° C. is performed.

The object is furthermore achieved by a method for producing the three-dimensional porous catalyst monolith of stacked catalyst fibers, comprising the following steps:

a) preparing a suspension paste in a liquid diluent of metal, metal alloy and/or metal oxide particles of catalytically active metal or metal alloy in which the metals, metal alloy and metal oxide particles are supported on or mixed with inorganic oxide catalyst support particles, and which suspension can furthermore comprise a binder material, all particles in the suspension having an average particle size in the range of from 0.5 to 500 μm, b) extruding the paste of step a) through one or more nozzles having a maximum diameter or less than 1 mm to form fibers, and depositing the extruded fibers to form a three-dimensional porous catalyst monolith precursor, c) drying the porous catalyst monolith precursor to remove the liquid diluent, d) if necessary, reducing the metal oxide(s) in the porous catalyst monolith precursor to form the catalytically active metal or metal alloy.

In this respect, a three-dimensional monolith is a one-piece structure made of at least two stacked layers of fibers.

Step b) is preferably controlled by a control system data set or CAD file as described below, preferably implemented on a computer system.

The object is furthermore achieved by a three-dimensional porous catalyst monolith of stacked catalyst fibers, obtainable by the above process.

The object is furthermore achieved by the use of the catalyst monolith in oxidation, hydrogenation, dehydration, desulphurization, amination or dehydrogenation reaction.

According to the present invention, it has been found that a three-dimensionally structured porous catalyst monolith as defined above has a high side crushing strength of at least 60 N even for fiber diameters of less than 1 mm. It has been found that the side crushing strength of the catalyst monolith is significantly higher than the side crushing strength of an individual fiber of which the catalyst monolith is composed. Thus, if the side crushing strength of the catalyst monolith is compared to the side crushing strength of a fiber having a diameter of less than 1 mm of which the catalyst monolith is composed, the side crushing strength of the catalyst monolith is preferably at least twice the side crushing strength of an individual fiber of which the catalyst monolith is composed. More preferably, the side crushing strength is at least 5 times, most preferably at least 10 times the side crushing strength of an individual fiber.

The side crushing strength of the catalyst monolith, preferably with dimensions 1.5 cm×1.5 cm×1.2 cm (x,y,z axis, z being the stacking direction), according to the present invention is preferably at least 60 N, more preferably at least 100 N, most preferably at least 300 N, when yz or xy opposite planar sides are pressed.

The determination of the side crushing strength (SCS) is for examples disclosed in Oil & Gas Science and Technology—Rev. IFP, Vol. 55 (2000), No. 1, pp. 67-85, specifically section 3.1.1. An example for the determination of the Side Crushing Strength (SCS) is as follows: This method covers the resistance of a formed catalyst microstructure to a compressive force. The micro-structure is subjected to a compressive load between jaws. The force required to crush the tablet is measured and recorded in Newton force. The operation is executed using the semi-automatic Schleuniger Model 6D hardness tester. The microstructure is tested with the YZ or XZ plane facing upright between the measure jaws. Press the "START"-button on the Schleuniger 6D. The jaws will slowly approach each other to execute the crushing test. The crushing strength is displayed on the Schleuniger and the computer monitor.

The maximum side crushing strength depends on the materials used for preparing the catalyst monolith and also on the three-dimensional structure of the catalyst monolith as well as the fiber diameter. The more contact points between the individual fiber layers are present, the higher the side crushing strength will be. Preferably, adjacent layers have at least 10 contact points, more preferably at least 20 contact points, most preferably at least 30 contact points to one neighboring layer. Thus, for a fiber layer, which has two neighboring layers, the number of contact points is twice the number stated above. Due to the contact points, the stack of fiber layers is self-supporting.

There is no upper limit for the side crushing strength of the catalyst monolith. Typically, the maximum side crushing strength is 100.000 N and often it is 10.000 N. Thus, the side crushing strength of the catalyst monolith according to the present invention is preferably in the range of from 60 to 100.000 N, more preferably 100 to 100.000 N and most preferably 300 to 100.000 N.

The maximum can also be the maximum that a machine for measuring SCS is able to measure. The maximum can depend on the size of the monolith. If the monolith is larger than the machine for measuring it allows, the monolith is cut to a suitable size, preferably 1.5 cm×1.5 cm×1.2 cm (xyz axis).

The fiber diameter in the catalyst monolith is less than 1 mm. The lower limit for the fiber diameter is dependent on the manufacturing process. Typically, the lower limit will be 0.1 or 0.2 mm. Preferably, the diameter is in the range of from 0.2 to less than 1.0 mm.

Each layer is preferably composed of 2 to 30.000, more preferably 2 to 10.000, most preferably 2 to 5.000 parallel fibers. The distance between two parallel fibers is preferably 0.1 to 10 times the fiber diameter, more preferably 0.5 to 5 times the fiber diameter, most preferably 0.5 to 2 times the fiber diameter.

The parallel fibers can be straight, curved, or partly straight (linear) and partly curved. Preferably at least 50 wt %, most preferably at least 70 wt % of the fibers are arranged as linear strands parallel to each other and spatially separated from each other, or wherein multiple cobweb patterns are stacked, wherein the direction of the strands in each layer is different from the direction in neighboring layers, so that a porous structure with contact points of strands of neighboring layers results.

Each layer can be made from one or more continuous fibers or individual fibers. The whole stack of fibers can furthermore be made from one or more continuous fibers or stacked individual fibers. Thus, the production process for the catalyst monolith is not restricted in any way. Individual cut fibers can be stacked in the desired manner, and one or more continuous fibers can be shaped in order to result in the desired fiber layer pattern and stacking pattern.

The catalyst monolith can have any desired number of stacked fiber layers. Preferably, the catalyst monolith has at least 10, more preferably at least 20 stacked fiber layers. There is no upper limit to the number of stacked fiber layers. For practical considerations, the upper limit is often 10.000 stacked fiber layers. Thus, preferably 10 to 200 stacked fiber layers, more preferably 20 to 130 stacked fiber layers are present.

Depending on the size of each layer and the number of stacked fiber layers, the catalyst preferably has a volume in the range of from 0.027 $cm^3$ to 125 $m^3$, more preferably from 0.027 $cm^3$ to 10 $m^3$, most preferably from 0.1 $cm^3$ to 5 $m^3$.

The catalyst monolith can be in the form of a cylinder with circular or ellipsoidal cross section, a cuboid, a sphere, an ellipsoid, a tablet or a polygon.

Depending on the stacking pattern and the distance between individual fibers, the porosity of the catalyst monolith can be adjusted; preferably the catalyst monolith has a porosity of at least 20%, more preferably of at least 30%. The porosity can be in the range of from 20 to 90%, or 20 to 80% as determined by the method indicated below.

The term "porous" employed here defines that the monolith is not a solid block of material, but contains channels or pores. By stacking spatially separated catalyst fiber layers in the ABA or ABACA, also referred to as ABC, manner, through-channels or pores can be formed. Thereby, pathways with direct line-of-sight or pathways with no direct line-of-sight can be formed.

Examples of layer structures or monolith structures which can be employed according to the present invention are illustrated in U.S. Pat. Nos. 7,527,671, 6,993,406 as well as the other documents cited in the introductory part above.

The catalytically active material in the catalyst monolith can be freely selected. Preferably, the catalytically active material is selected from the group consisting of Na, K, Mg, Ca, Ba, Al, $Al_2O_3$, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, and Ce and mixtures or alloys thereof.

The catalytically active material can be present on an inorganic oxide catalyst support. Preferably, the inorganic oxide catalyst support is selected from the group consisting of silicon dioxide, aluminium oxide, titanium dioxide, zirconium dioxide, magnesium oxide, calcium oxide, mixed metal oxides, hydrotalcites, spinels, perovskites, metal phosphates, silicates, zeolites, steatite, cordierite, carbides, nitrides or mixtures or blends thereof.

Preferred catalytic systems are discussed below.

The catalyst monolith according to the present invention can be prepared by different processes, for examples by robocasting, 3D printing or other processes. Preferably, the catalyst monolith is prepared by robocasting.

The present invention is illustrated by the robocasting process below. The materials and parameters of the catalyst monolith, however, also relate to other processes for preparing the catalyst monolith.

According to the present invention, it has been found that metal, metal alloy or metal oxide particles of catalytically active metals or metal alloys can be employed in a robocasting process, wherein no treatment or sintering step at temperatures above 1000° C. is necessary in order to obtain mechanically stable catalytically active structures.

When employing metals, metal alloys or metal oxides, supported on or mixed with inorganic oxide catalyst support particles, a high dispersion of the catalytically active metal or metal alloy can be achieved since no temperature treatment at temperatures above 1000° C. is necessary. Often, such temperature treatment leads to a lowering of the dispersion of the catalytically active metal or alloy.

Furthermore, it has been found that powders of prefabricated supported catalysts, with catalytically active metals being in oxide form, if appropriate, can be formed in a robocasting process without significantly changing their properties, e.g. active metal dispersion on the catalyst support. According to the above-mentioned known processes, supported catalysts were obtained at the end of the robocasting and sintering only.

The robocasting process allows for the manufacture of three-dimensional porous catalyst monolith structures of stacked catalyst fibers, which have an increased external surface area in comparison to normal extrudates.

This leads to higher activity and selectivity due to increased external surface area in diffusion-limited reactions, like hydrogenation reactions, oxidation reactions, dehydration, desulphurization, amination or dehydrogenation reactions.

An example of a hydrogenation reaction is that of butanal to butanol or butyne diol hydrogenation.

Furthermore, heat transport limited reactions like oxidation reactions, e.g. ethylene oxide reaction, can be envisaged.

A poisoning of sensitive catalysts can be successfully slowed down, for example, in the dearomatization of heavy feeds having high sulphur contents.

Furthermore, higher catalyst densities in the reactor can be achieved due to well-ordered stackings of fibers. A packing fraction of up to 70% is possible by employing regularly stacked catalyst fibers prepared according to the present invention.

A low pressure drop is possible, thus allowing to work with smaller fiber diameters compared to single extrudates.

The 3D structures formed from these smaller fibers are mechanically much stronger compared to the single extrudates, which are much too weak to be used in packed fixed-bed reactors.

The process according to the present invention leads to high active metal dispersions, which are as high as in the current commercial catalysts, because no high temperature treatments are necessary. The structures will only need an activation step that is also used for the current commercial catalysts.

When starting from powders of prefabricated catalysts, the original active metal (oxide) dispersion on the catalyst support can be maintained.

The 3D robocasting technique employed according to the present invention is well established and can be performed as described in U.S. Pat. Nos. 7,527,671, 6,027,326, 6,401,795, Catalysis Today 273 (2016), pages 234 to 243, or Journal of Catalysis 334 (2016), pages 110 to 115, or U.S. Pat. No. 6,993,406.

The 3D robocasting technique can be used with catalyst formulations which can be based on pastes that are currently used in standard extrusion techniques provided the particle size is small enough to pass the extrusion nozzle. The extrusion formulation or paste contains preformed catalytic materials, e.g. nickel precipitates, in which the nickel oxide particles are already present. If necessary, a binder can be added to the extrusion mixture.

The robocasting technique implies the extruding through one or more nozzles having a maximum diameter of less than 1 mm, preferably less than 0.8 mm. Most preferably, the diameter of the nozzle should be in the range of from 0.05 mm to 0.4 mm, most preferably from 0.2 mm to 0.4 mm. The nozzle can have any desired cross-section, e.g. circular, elliptical, square, star-shaped, lobbed. The maximum diameter is the largest diameter of a non-circular cross-section.

One of the main criteria for microextruding is the use of an extrudable paste that has the correct rheological properties for the microextruding technique. The above-mentioned literature gives detailed advice as how to obtain the required rheological properties.

If necessary, in the process according to the present invention, a viscosity adjusting agent can be employed. Typical viscosity adjusting agents are celluloses like carboxymethyl cellulose. Preferably, no viscosity adjusting agent or polymer is employed.

The catalytically active metal or metal alloy can be chosen from a variety of metals. Preferably, the catalytically active metal is selected from the group consisting of Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, and Ce and mixtures or alloys thereof.

Mixtures of two or more catalytically active metals may be employed. Thus, one or more catalytically active metal(s) can be employed according to the present invention. Most preferably, only one catalytically active metal is employed.

Preferably Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, and Ce or mixtures thereof are employed. Most preferably, Ni is employed as the sole catalytically active metal.

The metal can be employed in the form of metal, metal alloy or metal oxide. Nickel is preferably employed as nickel oxide. Preferably metal oxides of those catalytically active metals are employed which can be easily reduced after forming the three-dimensional porous catalyst monolith.

The monolith can be formed of the catalytically active metal or metal alloy alone. Preferably, the catalytically active metal, metal alloy or metal oxide is supported on or mixed with inorganic oxide catalyst support particles. Preferably, they are supported on the inorganic oxide catalyst support particles.

All commercially employed inorganic oxide catalyst support particles may be employed according to the present invention. Preferably, the inorganic oxide catalyst support is selected from the group consisting of silicon dioxide, aluminium oxide, titanium dioxide, zirconium dioxide, magnesium oxide, calcium oxide, mixed metal oxides, hydrotalcites, spinels, perovskites, metal phosphates, silicates, zeolites, steatite, cordierite, carbides, nitrides or mixtures or blends thereof.

The amount of catalytically active metal or metal alloy, which is based on the amount of support, is preferably in the range of from 0.1 to 95 wt %, more preferably 3 to 75 wt %, most preferably 8 to 65 wt %.

Most preferably, the catalytically active metal is nickel, wherein nickel oxide nanoparticles having an average particle size of less than 100 nm are supported on the inorganic oxide catalyst support, preferably in an amount of from 0.1 to 90 wt %, more preferably in an amount of from 3 to 75 wt %, most preferably in an amount of from 8 to 65 wt %, based on the inorganic oxide catalyst support.

For the nickel catalyst, a preferred inorganic oxide catalyst support is silica, having an average particle size in the range of from 0.05 to 200 µm, more preferably 1 to 100 µm.

In this respect, average particle sizes can be measured by sieving the particles or by photographic techniques like camsizer techniques. The average particle size refers to the number average particle size.

The nickel oxide nanoparticles on silica powder can be prepared by precipitation or as described in U.S. Pat. No. 9,045,410 B2. The nickel crystallite size on the final catalyst is on average less than 100 nm and preferably in the range of from 0.1 to 30 nm.

Nickel crystallite size can be determined by methods like TEM and XRD, preferably TEM. Active nickel surface areas can be measured by hydrogen temperature programmed desorption ($H_2$-TPD).

The suspension paste prepared in step a) of the process according to the present invention preferably has a solids content of 1 to 95 wt %, more preferably 10 to 65 wt %.

If necessary, a binder material for binding metal (oxide) and/or support particles together can be employed in the suspension paste. Preferred binder materials are selected from the group of inorganic binders such as clays, alumina, silica or mixtures thereof.

The amount of binder material in the suspension paste is preferably in the range of from 0.1 to 80 wt %, more preferably 1 to 15 wt %, based on the suspension paste.

Often, it is not necessary to additionally use organic binder materials in the suspension although their use is possible according to the invention. Therefore, preferably no organic binder material is present in the suspension.

The porosity is preferably at least 20%, more preferably at least 30% can preferably be in the range of from 20 to 90%, and can be determined by Hg-PV and He-density. It can be determined by the following formula. Porosity (%)=100−[(density of total microextruded structure/density of fiber material)×100]. The density of the total microextruded structure is determined by dividing its total weight by its total volume. The density of the fiber material can be determined by measuring Hg-PV and He-density.

Since the lattices or scaffolds formed from the fibers are self-supporting, open space remains between the fibers which leads to the porosity. Respective structures can be seen in the above-mentioned literature.

The catalyst monoliths according to the present invention show a low pressure drop when employed as a packed catalyst bed. Preferably, the pressure drop is lower than the pressure drop, e.g. less than half of the pressure drop, for a catalyst bed packed with individual catalyst fibers of the same diameter as employed in the catalyst monolith of the present invention.

The catalyst monoliths according to the present invention preferably show a surface-to-volume ratio of more than 2.

The robocasting process employed according to the present invention can also be described as 3D fiber deposition.

GENERAL DESCRIPTION OF 3DFD

3D Fiber Deposition (3DFD) is used to shape the powder. The 3DFD method is an adaptive manufacturing method whereby a highly loaded paste is extruded by a moving nozzle. By computer controlling the movement of the extrusion head in x, y and z-direction, a porous material can be produced from the extruded fibers or strands layer by layer. After drying, the porous material can be thermally dried. The main benefit of this technology is the degree of freedom with regard to the porous parameters (fiber thickness, interfiber distance and stacking design).

The typical flow chart for the 3DFD technology consists of the following subsequent steps: prepare highly viscous ceramic (or metallic) paste, extrude through thin nozzle, computer controlled deposition of fibers to form a ceramic (or metallic) porous periodic structure, drying and if necessary reducing.

The first important step is to make sure that no large particles are present in the paste. Therefore the particle size of the starting material is checked. If too large particles are present the powder is sieved to obtain the desired particle size. As a rule of thumb, the largest particle (represented by the d99 value) should preferably be at least five times smaller than the nozzle size that will be used, more preferably at least ten times smaller.

In the following step the powder is mixed together with the solvent/diluent (e.g. water), if necessary binder and additives, thus obtaining a viscous paste. A good mixing to achieve a homogenous paste (minimizing agglomerates or the incorporation of air bubbles) is a prerequisite for a smooth and reproducible process. The powder loading of the functional material depends on the specific surface area, the particle size distribution and the powder morphology. Generally, as the particle size of the powder decreases, the viscosity of the paste will increase. Therefore the solid loading needs to be lowered for these powders. Apart from organic or, preferably, inorganic binder(s), rheology modifiers can be added to control the rheological behavior of the paste. In some cases a defoamer is also added to avoid air bubbles in the paste.

After mixing and de-airing, the paste is transferred to the paste reservoir and mounted on the 3DFD set-up. The nozzle, preferably either plastic or metal (below 200 µm), is attached to the paste reservoir. Paste extrusion is achieved e.g. by a displacement pump or a screw pump. During deposition, it might be necessary to control the drying conditions.

After drying at room conditions (or under controlled atmosphere and temperature), the 3DFD structure is reduced, if necessary. No calcining or sintering at temperatures above 1000° C. is necessary.

Experimental procedure of 3DFD process

Obtaining a smooth process and a narrow control on the extrusion of thin filaments often requires adjustments of both the formulation of the paste and the experimental set-up. The main process parameters which have to be addressed are listed below.

Parameters

Particle size distribution of starting material
Preparation and mixing procedure of the paste
Paste formulation
De-airing & paste reservoir filling
Design of deposition platform
Height control of nozzle
Programming of turns and transition between layers
Tuning extrusion speed versus movement speed
Drying conditions during deposition For a further description of the process, reference can be made to the above-listed documents.

The stacking design is preferably as depicted in FIGS. 1 and 2 of U.S. Pat. No. 7,527,671. Most preferred is a 1-3-1 pattern.

The liquid diluent employed can be chosen from water and organic liquid diluents. Preferably, the liquid diluent contains mainly or is water.

The drying is preferably performed at a temperature in the range of from −100 to 1000° C., more preferably 0 to 300° C., most preferably 20 to 110° C.

The reducing of the metal oxide to form the catalytically active metal is performed in the presence of free hydrogen, preferably at a temperature in the range of from 1 to 1000° C., more preferably 100 to 600° C.

No treatment of the porous catalyst monolith precursor or porous catalyst monolith at temperatures above 1000° C., preferably above 900° C., more preferably above 750° C., is performed.

The monolith of stacked catalyst fibers is preferably three-dimensionally structured by depositing the extruded fibers in regular, recurring stacking pattern (periodically structured catalyst), to form a three-dimensionally structured porous catalyst monolith precursor.

The monolith can be formed form one (or more) continuous extruded fiber(s) or from multiple individual extruded fibers (e.g. for each layer).

Preferably, the regular, recurring stacking pattern is composed of stacked layers of extruded fibers, wherein in each layer at least 50 wt %, more preferably at least 90 wt % of the extruded fibers are deposited parallel to each other and spatially separated from each other. The parallel deposition can be in straight or curved lines. As an alternative, they can be deposited/stacked in a circular pattern with radial interlayers, like in a cobweb pattern.

More preferably, at least 50 wt %, most preferably at least 90 wt % of the extruded fibers are deposited as linear strands parallel to each other and spatially separated from each other, wherein the direction of the strands in each layer is different from the direction in neighboring layers, so that a porous structure with contact points of strands of neighboring stacks result. As an alternative, multiple cobweb pattern can be stacked, each pattern layer preferably rotated relative to its neighboring pattern layers.

One example of stacks of layers alternating by 90° in the direction is depicted in FIGS. 1 and 2 of U.S. Pat. No. 7,527,671.

The fibers or strands preferably have a thickness of 10 to 5000 µm, more preferably 10 to 1000 µm, most preferably 150 to 500 µm.

They are preferably spatially separated from each other by 10 to 5000 µm, more preferably 100 to 1000 µm, most preferably 200 to 800 µm.

One example is a stacking of 360 µm strands being spaced by 650 µm.

Typical monolith sizes are 1 cm$^3$ to 100000 m$^3$, more preferably 3 to 300000 cm$^3$.

In comparison to this, standard extrusion processes for nickel catalyst extrudates that are made on a regular basis have a minimum diameter of 1.2 mm. Depending on the formulation, these extrudates have a strength of 50 N or lower as measured by the SCS method (side crushing strength). This method is described e.g. in Oil & Gas Science and Technology—Rev. IFP, Vol. 55 (2000), No. 1, pp. 67-85.

The monoliths of the present invention preferably have a side crushing strength of at least 60 N, more preferably of at least 100 N, most preferably of at least 300 N.

Structures made from 360 µm fibers and 650 µm interfiber distance and ABAB or ABC stacking show a side crushing strength of a 1.5 cm-1.5 cm-1.5 cm structure of 666.8 N.

Thus, the process according to the present invention leads to catalyst structures having a high strength combined with a high surface area/porosity.

The invention also relates to a three-dimensional porous catalyst monolith of stacked catalyst fibers, obtainable by the above process.

The invention furthermore relates to the use of these monoliths as catalysts in oxidation, hydrogenation, dehydration, desulphurization, amination or dehydrogenation reactions. Preferably, the reactions involve a liquid phase or mixed liquid/gas phase.

The invention furthermore relates to a control system data set containing a plurality of control instructions which when implemented on an additive production facility prompt the additive production facility to produce a three-dimensional porous catalyst monolith or three-dimensional porous catalyst monolith precursor as described above.

Additive production facilities are for example 3D fiber deposition (3DFD), 3D printing, stereolitography, fused filament fabrication (FFF) or laser sintering. These facilities or equipments are used to shape the powder or paste in order to form the three-dimensional catalyst monolith or its precursor. Thus, the additive production facility can be a 3D fiber deposition printer, 3D printer, stereolitography device or laser sintering device. These production facilities or production equipments are typically computer-controlled using a CAD file (computer aided design file). The CAD file contains the information on the three-dimensional structure of the porous catalyst monolith or its precursor and is needed to operate the additive production facility.

This CAD file which can also be described as a control system data set contains a plurality of control instructions which drive the additive production facility, for example the moving nozzle in a 3D fiber deposition apparatus. The control system data set can also be described as control system data record or data drive set. The control system data set or CAD file contains all information necessary to drive the additive production facility in order to produce the monolith or monolith precursor. This meaning is encompassed by the term "prompt" as used above. The control system data set and control instructions are typically electronic data stored on appropriate data storing device which can be a CD, DVD, USB stick, hard drive or SSD drive of a computer or attached to a computer.

The control system data set is typically loaded to the computer controlling the additive production facility prior to printing or extruding the 3D structure. Thus, the term "implementing" typically means loading the control system data or control instructions in a computer system which operates the additive production facility. Thus, the additive production facility then has the control instructions implemented thereon.

The invention will be further illustrated by the following example.

Example of 3D microextruded catalyst:

3D microextruded nickel catalyst

A suspension was made from the catalyst precursor powder (nickel oxide nanoparticles on silica powder, obtained by precipitation), clay binder, and demi-water. The suspension was made by mixing the three components in the following mass percentages: 30.6% catalyst precursor, 4.4% clay, 65% demi-water. The ingredients were manually added and mixed by special mixing equipment (speedmixer) to obtain the right rheological properties for extruding through a 400 μm sized nozzle. The particle size of the powder was selected to allow for this extrusion. The suspension is brought in a dispensing unit consisting of a syringe vessel and a nozzle. The unit is mounted on a microextruder machine. The microextruder is a computer numerical control (CNC) machine that is programmed to move according to a well-defined pattern and within a well-defined form. The CNC machine is programmed to continuously deposit filaments layer by layer in a predefined pattern. Depending on the thickness of the filaments foreseen in the application, a nozzle with the right diaphragm opening will be chosen, e.g. between 0.1 and 2 mm. The deposition parameters, e.g. the distance between the nozzle and the surface of the structure, the speed of the nozzle movement, the air pressure and the temperature and airflow of the environment, etc. are regulated. A 3D-structure is built in a box by depositing the filaments layer by layer according to the programmed pattern and according to the required dimensions. The 3D structures were afterwards dried at 80° C. for 2 days at 95% relative humidity. A hydrogen treatment at 350° C. was given to reduce the nickel oxide nanoparticles into nickel. The structure (ABAB stacking of 1.55 cm×1.55 cm×1.25 cm lxbxh) was tested on its side crushing strength and this was found to be 660 N in the x-x direction. The determination of the side crushing strength (SCS) is for examples disclosed in Oil & Gas Science and Technology—Rev. IFP, Vol. 55 (2000), No. 1, pp. 67-85, specifically section 3.1.1. It can be performed as follows: This method covers the resistance of a formed catalyst microstructure to a compressive force. The microstructure is subjected to a compressive load between jaws. The force required to crush the tablet is measured and recorded in Newton force. The operation is executed using the semi-automatic Schleuniger Model 6D hardness tester. The microstructure is tested with the YZ or XZ plane facing upright between the measure jaws. Press the "START"-button on the Schleuniger 6D. The jaws will slowly approach each other to execute the crushing test. The crushing strength is displayed on the Schleuniger and the computer monitor. The size of the nickel (oxide) nanoparticles did not change between the powder and the monolith.

The invention claimed is:

1. A three-dimensionally structured porous catalyst monolith of stacked catalyst fibers with a fiber diameter of less than 1 mm made from one or more continuous fibers or stacked individual fibers, wherein the stacked catalyst fibers are arranged in a regular, recurring stacking pattern of fiber layers to form the three-dimensionally structured monolith, and wherein in each of the stacked fiber layers at least 50 wt % of the fibers are arranged parallel to each other and spatially separated from each other, or in a cobweb pattern, and wherein the side crushing strength of the monolith is at least 60 N, in which the monolith is formed of catalytically active metal or metal alloy supported on inorganic oxide catalyst support particles, starting from powders of prefabricated catalysts, obtained by a method comprising the following steps:
 a) preparing a suspension paste in a liquid diluent of powders of prefabricated supported catalysts, in which metal, metal alloy and/or metal oxide particles of the catalytically active metal or metal alloy are supported on inorganic oxide catalyst support particles, and which suspension can furthermore comprise a binder material, all particles in the suspension having a number average particle size in the range of from 0.5 to 500 μm, measured by sieving the particles or by photographic techniques,
 b) extruding the paste of step a) through one or more nozzles having a maximum diameter of less than 1 mm to form fibers, and depositing the extruded fibers to form a three-dimensional porous catalyst monolith precursor,
 c) drying the porous catalyst monolith precursor to remove the liquid diluent, optionally reducing the metal oxide(s) in the porous catalyst monolith precursor to form the catalytically active metal or metal alloy,
 wherein no temperature treatment of the porous catalyst monolith precursor or porous catalyst monolith at temperatures above 1000° C. is performed.

2. The catalyst monolith of claim 1, wherein the side crushing strength of the catalyst monolith is at least twice the side crushing strength of an individual fiber of which the catalyst monolith is composed.

3. The catalyst monolith of claim 1, wherein the side crushing strength is at least 100 N.

4. The catalyst monolith of claim 1, wherein the fiber diameter is in the range of from 0.2 to less than 1.0 mm.

5. The catalyst monolith of claim 1, wherein the catalyst monolith is in the form of a cylinder with circular or ellipsoidal cross section, a cuboid, a sphere, an ellipsoid, a tablet or a polygon.

6. The catalyst monolith of claim 1, wherein at least 50 wt % of the fibers are arranged as linear strands parallel to each other and spatially separated from each other, or wherein multiple cobweb patterns are stacked, wherein the direction of the strands in each layer is different from the direction in neighboring layers, so that a porous structure with contact points of strands of neighboring layers results.

7. The catalyst monolith of claim 1, wherein the catalyst monolith has at least 10 stacked fiber layers.

8. The catalyst monolith of claim 1, wherein the catalyst monolith has a volume in the range of from 0.027 cm$^3$ to 125 m$^3$.

9. The catalyst monolith of claim 1, wherein the catalyst monolith has a porosity of at least 20% determined by Hg-PV or HE-density.

10. The catalyst monolith of claim 1, wherein the catalytically active metal is selected from the group consisting of Na, K, Mg, Ca, Ba, Al, Al$_2$O$_3$, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, and Ce and mixtures or alloys thereof.

11. The catalyst monolith of claim 1, wherein the catalytically active metal or metal alloy is supported on an inorganic oxide catalyst support selected from the group consisting of silicon dioxide, aluminium oxide, titanium dioxide, zirconium dioxide, magnesium oxide, calcium oxide, mixed metal oxides, hydrotalcites, spinels, perovskites, metal phosphates, silicates, zeolites, steatite, cordierite, carbides, nitrides, and mixtures or blends thereof.

12. The catalyst monolith of claim 1, wherein the side crushing strength is at least 100 N 300 N.

13. The catalyst monolith of claim 1, wherein at least 70 wt % of the fibers are arranged as linear strands parallel to each other and spatially separated from each other, or wherein multiple cobweb patterns are stacked, wherein the direction of the strands in each layer is different from the direction in neighboring layers, so that a porous structure with contact points of strands of neighboring layers results.

14. The catalyst monolith of claim 1, wherein the catalyst monolith has at least 20 stacked fiber layers.

15. The catalyst monolith of claim 1, wherein the catalyst monolith has a porosity of at least 30% determined by Hg-PV or HE-density.

16. A method for producing the three-dimensional porous catalyst monolith of stacked catalyst fibers of claim 1, comprising the following steps:
   a) preparing a suspension paste in a liquid diluent of powders of prefabricated supported catalysts, in which metal, metal alloy and/or metal oxide particles of the catalytically active metal or metal alloy are supported on inorganic oxide catalyst support particles, and which suspension can furthermore comprise a binder material, all particles in the suspension having a number average particle size in the range of from 0.5 to 500 µm, measured by sieving the particles or by photographic techniques,
   b) extruding the paste of step a) through one or more nozzles having a maximum diameter or less than 1 mm to form fibers, and depositing the extruded fibers to form a three-dimensional porous catalyst monolith precursor,
   c) drying the porous catalyst monolith precursor to remove the liquid diluent, optionally reducing the metal oxide(s) in the porous catalyst monolith precursor to form the catalytically active metal or metal alloy,
   wherein no temperature treatment of the porous catalyst monolith precursor or porous catalyst monolith at temperatures above 1000° C. is performed.

17. The method according to claim 16, wherein nickel oxide nanoparticles having a number average particle size of less than 100 nm, measured by photographic techniques, are supported on the inorganic oxide catalyst support particles.

18. The method according to one of claim 16, wherein a binder material is employed, selected from the group consisting of inorganic binders.

19. The method according to claim 16, wherein nickel oxide nanoparticles having a number average particle size of less than 100 nm, measured by photographic techniques, are supported on the inorganic oxide catalyst support particles in an amount of from 1 to 70 wt %, based on the inorganic oxide catalyst support particles, wherein the inorganic oxide catalyst support is silica, having a number average particle size in the range of from 0.05 to 200 µm, measured by sieving the particles or by photographic techniques.

20. The method according to one of claim 16, wherein a binder material is employed, selected from the group consisting of clays, alumina, silica and mixtures thereof, and wherein no organic binder material is present in the suspension.

\* \* \* \* \*